Sept. 14, 1937.   A. H. WILDE   2,093,378
EGG CLEANING DEVICE
Filed May 19, 1937   2 Sheets-Sheet 2
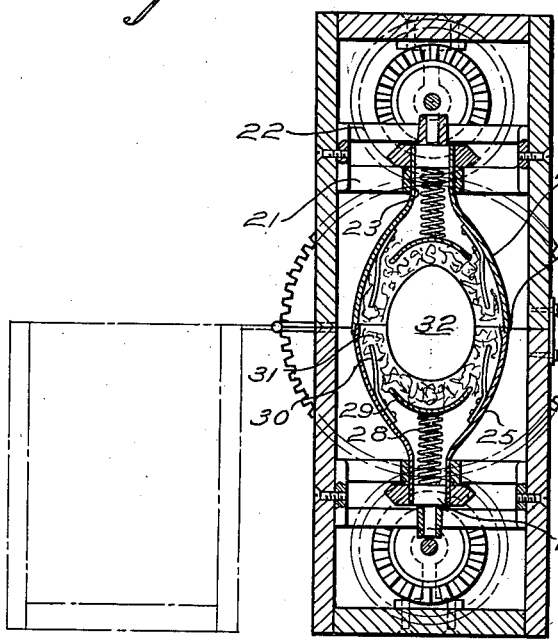
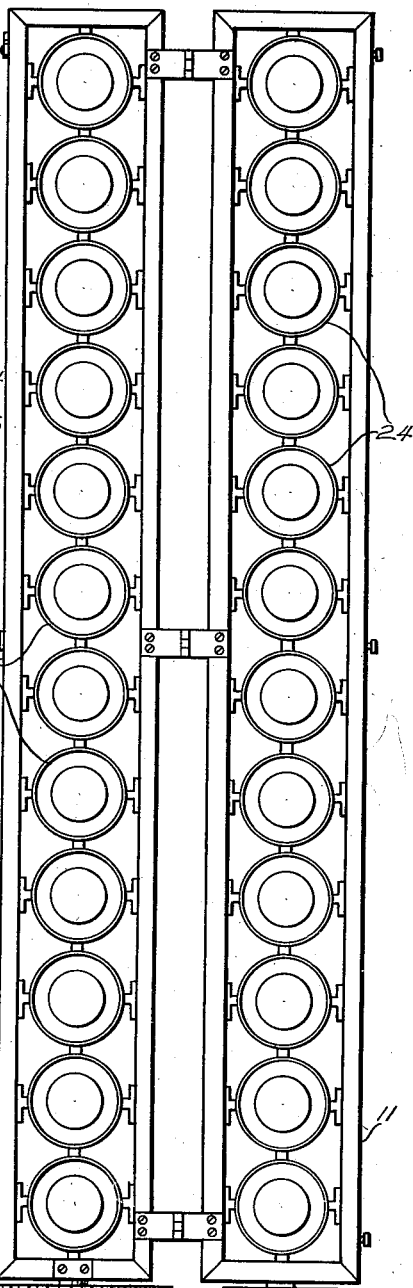
Alton H. Wilde
INVENTOR
BY Victor J. Evans & Co.
ATTORNEYS Patented Sept. 14, 1937

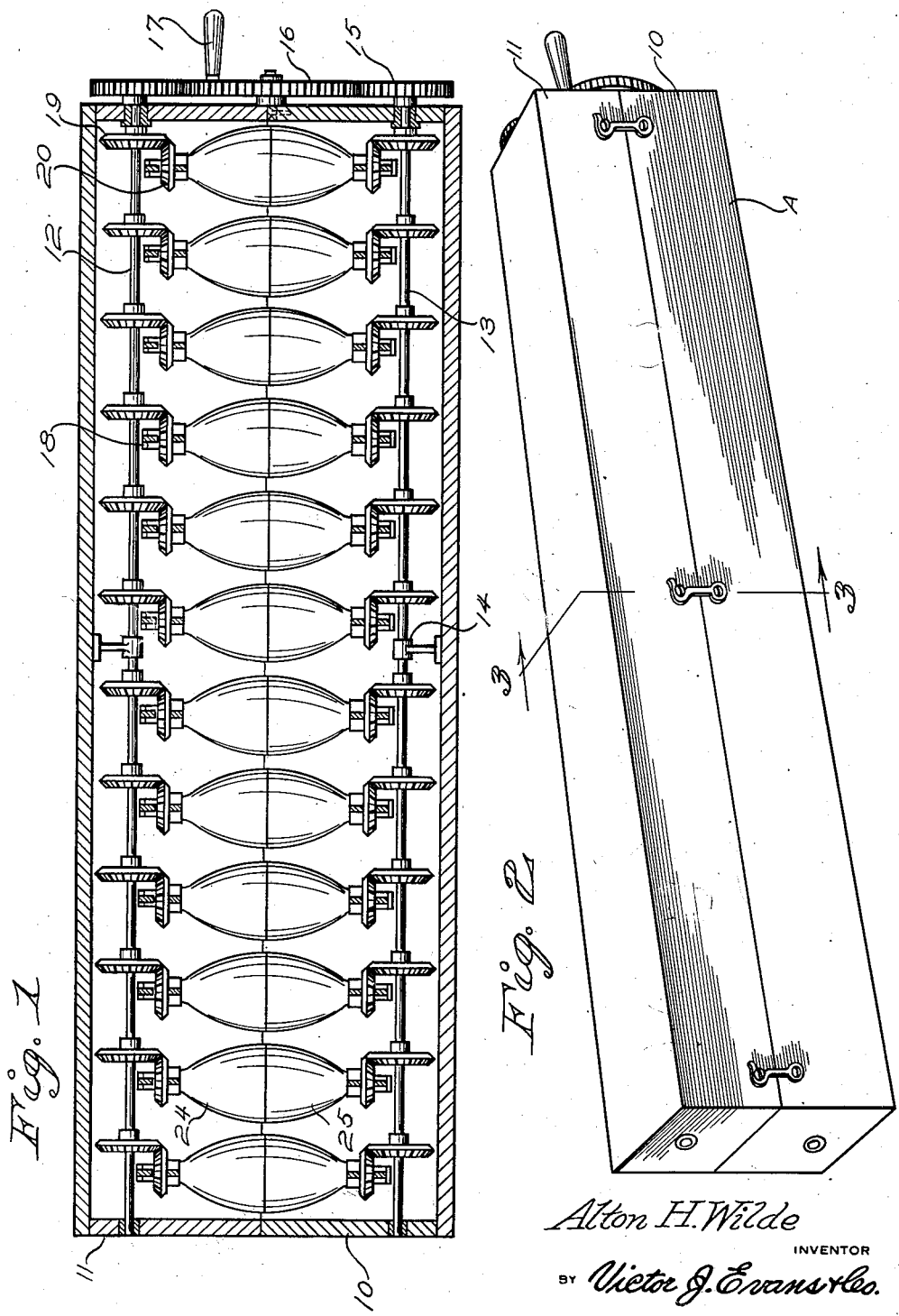

2,093,378

UNITED STATES PATENT OFFICE 2,093,378

EGG CLEANING DEVICE

Alton H. Wilde, Hannibal, N. Y.

Application May 19, 1937, Serial No. 143,597

6 Claims. (Cl. 146—198)

The invention relates to a cleaning device and more particularly to an egg cleaning apparatus.

The primary object of the invention is the provision of an apparatus of this character, wherein through a rotary drive eggs can be cleaned and wiped with dispatch so as to eliminate the individual hand scrubbing of the eggs as well as the washing and drying of the same.

Another object of the invention is the provision of an apparatus of this character, wherein the holders for the eggs are in two sections each and these when assembled with each other are reversely driven one with respect to the other so that a scrubbing and cleaning action will be set up with the result that the egg can be thoroughly cleaned in its entirety.

Another object of the invention is the provision of an apparatus of this character, wherein the construction of the same is novel in its entirety and will enable the cleaning of a number of eggs in a single operation of the apparatus, the eggs being readily introduced and removed from the machine.

A still further object of the invention is the provision of an apparatus of this character, which is simple in its construction, thoroughly reliable and efficacious in operation, light in weight yet strong and durable, portable and enables the cleaning of a determined number of eggs with dispatch and in a single operation and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a vertical longitudinal sectional view through the apparatus constructed in accordance with the invention.

Figure 2 is a perspective view of the apparatus.

Figure 3 is an enlarged transverse sectional view taken on the line 3—3 of Figure 2 looking in the direction of the arrows.

Figure 4 is a top plan view of the apparatus shown in open position.

Figure 5 is a horizontal sectional view taken through one of the egg holders of the apparatus.

Similar reference characters indicate corresponding parts throughout the several views in the drawings.

Referring to the drawings in detail, the apparatus constructed in accordance with the invention comprises an elongated or substantially rectangular shaped casing A preferably formed in two sections 10 and 11, respectively, the latter serving as a cover section while the said section 10 constitutes the lower or body section of said casing.

Extended longitudinally of these sections 10 and 11 at the center thereof following the longitudinal axes of the same are rotary shafts 12 and 13, respectively, these being suitably journaled in the ends of the said sections 10 and 11 and also journaled in bearings 14 intermediate of their lengths which bearings are carried by the sections 10 and 11 and are fastened thereto in any desirable manner. The shafts 12 and 13 at one end of the sections 10 and 11 project exteriorly of the casing A and have fixed to these projected ends reversely driven gears 15 meshing with an intermediate power gear 16 provided with a hand crank 17 so that the shafts will be rotated reversely to the power gear 16 on the operation of the power gear 16 which is manually controlled.

Arranged transversely of the sections 10 and 11 and fixedly secured in uniformly spaced relation are dual armed brackets 18 which are fixed in any desirable manner to opposite sides of said sections in proximity to the shafts 12 and 13. Fixed to the shafts 12 and 13 close to the brackets 18 are beveled gears 19 meshing with companion beveled pinions 20 which are arranged between the arms 21 and 22 of the said brackets 18 and are made fast to the contracted ends 23 of individual two-part egg holders of bulged shell formation preferably constructed from metal and the parts 24 and 25 of each holder at their open meeting ends are separably interfitted with each other effecting an overlapped sealed joint 26 therebetween when the section 11 is closed onto the section 10 of the casing A. The driving connection between the parts 24 and 25 with the shafts 12 and 13 causes one part to rotate in one direction and the other part to rotate in the reverse direction in the operation of the apparatus.

Fixed in the contracted ends 23 of the parts 24 and 25 of the holders and rotatably connected to the arms 22 of the brackets 18 are the members 27 carrying coiled compression springs 28 having followers 29 while interiorly of each of the parts 24 and 25 of a holder are leaf tensioning springs 30 which with the followers 29 act upon cleaning material 31 enveloping an egg 32 when within each holder so that this material will have wiper or scrubbing action upon the egg enveloped thereby for the thorough cleaning of such egg when the apparatus is operated. The followers 29 and the springs 30 exert pressure upon the material 31 to hold the same in contact with the shell of the egg 32 with the result that a thorough cleaning, either by washing or scrubbing action thereon, is had. Additionally, each egg 32 so acted upon may be thoroughly dried and when removed from the apparatus will be clean and dry throughout the entire extent of the shell of the same.

What is claimed is:

1. An egg cleaning apparatus comprising a case having an opening and closing cover section, rotatable shafts journaled in spaced parallel relation to each other interiorly of the case, one of said shafts being carried by the cover section, a plurality of separably sectioned egg receiving shells between said shafts, cleaning material within the shells and active upon eggs in the latter for the cleaning thereof, and connections between the shafts and the separable sections of the shells for reversely rotary driving said sections with respect to each other.

2. An egg cleaning apparatus comprising a case having an opening and closing cover section, rotatable shafts journaled in spaced parallel relation to each other interiorly of the case, one of said shafts being carried by the cover section, a plurality of separably sectioned egg receiving shells between said shafts, cleaning material within the shells and active upon eggs in the latter for the cleaning thereof, connections between the shafts and the separable sections of the shells for reversely rotary driving said sections with respect to each other, and means within the shells for exerting tension of the cleaning material and effecting close contact thereof with the eggs.

3. An egg cleaning apparatus comprising a case having an opening and closing cover section, rotatable shafts journaled in spaced parallel relation to each other interiorly of the case, one of said shafts being carried by the cover section, a plurality of separably sectioned egg receiving shells between said shafts, cleaning material within the shells and active upon eggs in the latter for the cleaning thereof, connections between the shafts and the separable sections of the shells for reversely rotary driving said sections with respect to each other, means within the shells for exerting tension of the cleaning material and effecting close contact thereof with the eggs, and spring tensioned followers fitting the sections of the shells and active upon the cleaning material.

4. An egg cleaning apparatus comprising a case having an opening and closing cover section, rotatable shafts journaled in spaced parallel relation to each other interiorly of the case, one of said shafts being carried by the cover section, a plurality of separably sectioned egg receiving shells between said shafts, cleaning material within the shells and active upon eggs in the latter for the cleaning thereof, connections between the shafts and the separable sections of the shells for reversely rotary driving said sections with respect to each other, means within the shells for exerting tension of the cleaning material and effecting close contact thereof with the eggs, spring tensioned followers fitting the sections of the shells and active upon the cleaning material, and means for rotating the shafts.

5. An egg cleaning apparatus comprising a case having an opening and closing cover section, rotatable shafts journaled in spaced parallel relation to each other interiorly of the case, one of said shafts being carried by the cover section, a plurality of separably sectioned egg receiving shells between said shafts, cleaning material within the shells and active upon eggs in the latter for the cleaning thereof, connections between the shafts and the separable sections of the shells for reversely rotary driving said sections with respect to each other, means within the shells for exerting tension of the cleaning material and effecting close contact thereof with the eggs, spring tensioned followers fitting the sections of the shells and active upon the cleaning material, and means for rotating the shafts and located exteriorly of the case.

6. An egg cleaning apparatus comprising a case having an opening and closing cover section, rotatable shafts journaled in spaced parallel relation to each other interiorly of the case, one of said shafts being carried by the cover section, a plurality of separably sectioned egg receiving shells between said shafts, cleaning material within the shells and active upon eggs in the latter for the cleaning thereof, connections between the shafts and the separable sections of the shells for reversely rotary driving said sections with respect to each other, means within the shells for exerting tension of the cleaning material and effecting close contact thereof with the eggs, spring tensioned followers fitting the sections of the shells and active upon the cleaning material, means for rotating the shafts and located exteriorly of the case, and means for supporting the sections of the shells in the case and cover section therefor.

ALTON H. WILDE.